(12) United States Patent
Kometani et al.

(10) Patent No.: US 12,176,756 B2
(45) Date of Patent: Dec. 24, 2024

(54) STATOR WITH STATOR MAGNET, MAGNETIC BODY, FIXING MEMBER, AND COIL DISPOSED IN SLOTS AND ROTARY ELECTRIC MACHINE USING SAME

(71) Applicant: Mitsubishi Electric Corporation, Tokyo (JP)

(72) Inventors: Haruyuki Kometani, Tokyo (JP); Ryoji Miyatake, Tokyo (JP); Takuro Yamada, Tokyo (JP); Kenji Tanaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 240 days.

(21) Appl. No.: 17/779,553

(22) PCT Filed: Jan. 21, 2020

(86) PCT No.: PCT/JP2020/001816
§ 371 (c)(1),
(2) Date: May 25, 2022

(87) PCT Pub. No.: WO2021/149131
PCT Pub. Date: Jul. 29, 2021

(65) Prior Publication Data
US 2023/0026553 A1 Jan. 26, 2023

(51) Int. Cl.
*H02K 1/17* (2006.01)
*H02K 1/16* (2006.01)
(Continued)

(52) U.S. Cl.
CPC ............... *H02K 1/17* (2013.01); *H02K 1/16* (2013.01); *H02K 9/19* (2013.01); *H02K 16/02* (2013.01)

(58) Field of Classification Search
CPC ............ H02K 1/17; H02K 1/185; H02K 1/20; H02K 1/16; H02K 9/06; H02K 9/19; H02K 16/02
(Continued)

(56) References Cited

U.S. PATENT DOCUMENTS

| | | | | |
|---|---|---|---|---|
| 984,182 A | * | 2/1911 | Barr | ........................ H02K 3/487 310/214 |
| 1,024,572 A | * | 4/1912 | Hellmund | .............. H02K 3/487 310/214 |

(Continued)

FOREIGN PATENT DOCUMENTS

| | | |
|---|---|---|
| EP | 2369719 A2 | 9/2011 |
| EP | 3934072 A1 | 1/2022 |

(Continued)

OTHER PUBLICATIONS

International Search Report and Written Opinion mailed on Apr. 7, 2020, received for PCT Application PCT/JP2020/001816, Filed on Jan. 21, 2020, 8 pages including English Translation.

(Continued)

*Primary Examiner* — Maged M Almawri
(74) *Attorney, Agent, or Firm* — XSENSUS LLP

(57) ABSTRACT

A stator includes: a stator core including a plurality of stator teeth in a circumferential direction with respect to a center of rotation of a rotary electric machine; a stator coil disposed on a bottom portion side of each of a plurality of stator slots formed between the stator teeth; and a stator magnet disposed on an opening side of each of the plurality of stator slots and having the same polarity in a radial direction. In each of the stator slots, a plate-shaped fixing member is provided between the stator coil and the stator magnet so as (Continued)

to be fitted to opposed two wall surfaces of the stator slot, and a magnetic body is provided between the stator coil and the stator magnet.

19 Claims, 11 Drawing Sheets

(51) Int. Cl.
 *H02K 9/19* (2006.01)
 *H02K 16/02* (2006.01)
(58) Field of Classification Search
 USPC .... 310/154.18, 154.17, 154.03, 154.01, 155, 310/154.02, 154.13, 154.32, 214, 215, 310/216.125, 216.113
 See application file for complete search history.

(56) References Cited

U.S. PATENT DOCUMENTS

| | | | | | |
|---|---|---|---|---|---|
| 1,150,022 | A * | 8/1915 | Field | ............... | H02K 3/487 310/214 |
| 1,260,674 | A * | 3/1918 | Jackson | ............... | H02K 3/487 310/214 |
| 1,268,020 | A * | 5/1918 | Kuyser | ............... | H02K 9/227 310/64 |
| 1,494,047 | A * | 5/1924 | Williamson | ............... | H02K 1/20 310/216.118 |
| 2,015,554 | A * | 9/1935 | Fisher | ............... | H02K 3/493 310/214 |
| 2,661,434 | A * | 12/1953 | Kilbourne | ............... | H02K 9/00 310/64 |
| 2,664,512 | A * | 12/1953 | Huntley | ............... | H02K 3/24 310/64 |
| 2,727,161 | A * | 12/1955 | Kilner | ............... | H02K 3/22 310/64 |
| 2,745,030 | A * | 5/1956 | Baldwin | ............... | H02K 3/487 310/214 |
| 3,119,033 | A * | 1/1964 | Horsley | ............... | H02K 3/24 310/214 |
| 3,408,516 | A * | 10/1968 | Kudlacik | ............... | H02K 3/487 310/195 |
| 3,437,858 | A * | 4/1969 | White | ............... | H02K 3/487 174/DIG. 19 |
| 3,440,462 | A * | 4/1969 | Willyoung | ............... | H02K 3/487 310/58 |
| 3,444,407 | A * | 5/1969 | Yates | ............... | H02K 3/48 174/DIG. 20 |
| 3,488,532 | A * | 1/1970 | Anderson | ............... | H02K 9/20 310/58 |
| 3,517,232 | A * | 6/1970 | Kazuo | ............... | H02K 3/24 310/59 |
| 3,862,445 | A * | 1/1975 | Volkrodt | ............... | H02K 23/24 310/181 |
| 3,949,255 | A * | 4/1976 | Brown | ............... | H02K 3/487 310/214 |
| 3,984,711 | A * | 10/1976 | Kordik | ............... | H02K 37/20 310/154.07 |
| 4,152,610 | A * | 5/1979 | Wallenstein | ............... | H02K 3/24 310/59 |
| 4,179,635 | A * | 12/1979 | Beermann | ............... | H02K 3/487 310/214 |
| 4,228,375 | A * | 10/1980 | Beermann | ............... | H02K 3/47 310/194 |
| 4,282,450 | A * | 8/1981 | Eckels | ............... | H02K 55/04 336/DIG. 1 |
| 4,298,812 | A * | 11/1981 | Damiron | ............... | H02K 3/24 310/55 |
| 4,308,476 | A * | 12/1981 | Schuler | ............... | H02K 3/40 310/213 |
| 4,385,252 | A * | 5/1983 | Butman, Jr. | ............... | H02K 3/48 310/214 |
| 4,634,911 | A * | 1/1987 | Studniarz | ............... | H02K 3/32 310/214 |
| 4,667,125 | A * | 5/1987 | Kaminski | ............... | H02K 3/48 310/214 |
| 4,827,597 | A * | 5/1989 | Hein | ............... | H02K 3/493 29/609 |
| 5,252,877 | A * | 10/1993 | Sawa | ............... | H02K 3/493 310/214 |
| 5,258,681 | A * | 11/1993 | Hibino | ............... | H02K 3/493 310/214 |
| 5,325,008 | A * | 6/1994 | Grant | ............... | H02K 3/48 29/446 |
| 5,329,197 | A * | 7/1994 | Kudlacik | ............... | H02K 3/24 310/198 |
| 5,489,810 | A * | 2/1996 | Ferreira | ............... | H02K 1/32 310/58 |
| 5,519,269 | A * | 5/1996 | Lindberg | ............... | H02K 9/197 310/58 |
| 5,698,924 | A * | 12/1997 | Nishida | ............... | H02K 1/32 310/59 |
| 5,796,186 | A * | 8/1998 | Nanba | ............... | H02K 41/03 310/12.24 |
| 5,821,652 | A * | 10/1998 | Hyypio | ............... | H02K 11/0141 310/83 |
| 5,854,525 | A * | 12/1998 | Pommelet | ............... | H02K 5/128 310/214 |
| 5,866,964 | A * | 2/1999 | Li | ............... | H02K 19/103 318/701 |
| 6,121,708 | A * | 9/2000 | Muller | ............... | H02K 3/487 310/59 |
| 6,252,325 | B1 * | 6/2001 | Nashiki | ............... | H02K 19/103 310/155 |
| 6,262,503 | B1 * | 7/2001 | Liebman | ............... | H01F 27/2876 310/58 |
| 6,268,668 | B1 * | 7/2001 | Jarczynski | ............... | H02K 3/24 310/52 |
| 6,278,217 | B1 * | 8/2001 | Kliman | ............... | H02K 15/085 310/179 |
| 6,856,053 | B2 * | 2/2005 | LeFlem | ............... | H02K 3/47 310/194 |
| 7,242,119 | B2 * | 7/2007 | Gomes De Lima | ..... | H02K 3/24 310/52 |
| 7,859,146 | B2 * | 12/2010 | Robinson | ............... | H02K 3/24 310/58 |
| 7,868,506 | B2 * | 1/2011 | Hoang | ............... | H02K 1/148 310/154.11 |
| 7,973,446 | B2 * | 7/2011 | Calley | ............... | H02K 21/125 310/216.061 |
| 8,040,002 | B2 * | 10/2011 | Tartaglione | ............... | H02K 3/22 310/201 |
| 8,362,661 | B2 * | 1/2013 | DeBlock | ............... | H02K 1/20 310/59 |
| 8,847,445 | B2 * | 9/2014 | Kowalski | ............... | H02K 1/32 310/58 |
| 8,941,281 | B2 * | 1/2015 | Kabata | ............... | H02K 3/487 310/58 |
| 9,106,122 | B2 * | 8/2015 | Fahimi | ............... | H02K 19/06 |
| 9,413,213 | B2 * | 8/2016 | Lee | ............... | H02K 19/103 |
| 9,590,457 | B2 * | 3/2017 | Hattori | ............... | H02K 3/16 |
| 9,729,020 | B2 * | 8/2017 | Pal | ............... | H02K 3/24 |
| 10,110,079 | B2 * | 10/2018 | Gehrke | ............... | H02K 11/042 |
| 10,236,737 | B2 * | 3/2019 | Röer | ............... | H02K 3/24 |
| 10,348,174 | B2 * | 7/2019 | Asano | ............... | H02K 1/17 |
| 11,190,063 | B2 * | 11/2021 | Hoerz | ............... | H02K 9/227 |
| 11,258,322 | B2 * | 2/2022 | Karmaker | ............... | H02K 1/26 |
| 11,411,444 | B2 * | 8/2022 | Lin | ............... | H02K 37/14 |
| 11,451,103 | B2 * | 9/2022 | E Silva | ............... | H02K 3/30 |
| 11,539,256 | B2 * | 12/2022 | Diehl | ............... | H02K 3/28 |
| 2003/0122440 | A1 * | 7/2003 | Horst | ............... | H02K 21/44 310/216.074 |
| 2004/0084975 | A1 * | 5/2004 | Thiot | ............... | H02K 1/20 310/58 |
| 2004/0135441 | A1 * | 7/2004 | Groening | ............... | H02K 1/20 310/58 |
| 2005/0200212 | A1 * | 9/2005 | Lima | ............... | H02K 1/20 310/59 |

(56) References Cited

U.S. PATENT DOCUMENTS

| | | | |
|---|---|---|---|
| 2007/0182258 A1* | 8/2007 | Klaussner | H02K 3/50 310/58 |
| 2008/0030092 A1* | 2/2008 | Rolando Avila Cusicanqui | H02K 21/44 310/154.02 |
| 2008/0169718 A1* | 7/2008 | Bott | H02K 21/44 310/155 |
| 2009/0121557 A1* | 5/2009 | Yang | H02K 23/22 310/154.02 |
| 2010/0019626 A1* | 1/2010 | Stout | H02K 3/50 310/214 |
| 2010/0162560 A1* | 7/2010 | Lape | H02K 15/0006 310/214 |
| 2011/0234038 A1 | 9/2011 | Kobayashi et al. | |
| 2012/0217827 A1* | 8/2012 | Takeuchi | H02K 3/30 310/154.02 |
| 2012/0306298 A1* | 12/2012 | Kim | H02K 16/00 310/46 |
| 2014/0265693 A1* | 9/2014 | Gieras | H02P 9/34 310/154.02 |
| 2014/0300220 A1* | 10/2014 | Marvin | H02K 3/24 29/596 |
| 2015/0091398 A1* | 4/2015 | Bradfield | H02K 3/24 29/596 |
| 2015/0171676 A1 | 6/2015 | Kobayashi et al. | |
| 2015/0372566 A1* | 12/2015 | Airoldi | F03D 80/80 290/55 |
| 2016/0006304 A1* | 1/2016 | Tojima | H02K 1/2706 310/154.02 |
| 2017/0250594 A1 | 8/2017 | Asano et al. | |
| 2021/0036568 A1* | 2/2021 | Schulz | H02K 3/12 |
| 2021/0044160 A1* | 2/2021 | Leiber | H02K 1/148 |
| 2022/0052596 A1 | 2/2022 | Ukaji et al. | |
| 2023/0198319 A1* | 6/2023 | Yamada | H02K 16/02 310/114 |
| 2023/0318386 A1* | 10/2023 | Hashimoto | H02K 15/0018 310/214 |

FOREIGN PATENT DOCUMENTS

| | | |
|---|---|---|
| JP | 2007-221913 A | 8/2007 |
| JP | 2016-135014 A | 7/2016 |
| WO | 2006/106087 A1 | 10/2006 |

OTHER PUBLICATIONS

Extended European search report issued on Dec. 20, 2022, in corresponding European patent Application No. 20915790.8, 8 pages.

* cited by examiner

STATOR WITH STATOR MAGNET, MAGNETIC BODY, FIXING MEMBER, AND COIL DISPOSED IN SLOTS AND ROTARY ELECTRIC MACHINE USING SAME

CROSS-REFERENCE TO RELATED APPLICATION

The present application is based on PCT filing PCT/JP2020/001816, filed Jan. 21, 2020, the entire contents of which is incorporated herein by reference.

TECHNICAL FIELD

The present disclosure relates to a stator and a rotary electric machine using the same.

BACKGROUND ART

Conventionally, a mechanical transmission in which a rotary electric machine is connected to a rotary shaft provided at the center of rotation and which reduces the rotation of the rotary electric machine has been used for applications that require low-speed drive. In the case where a mechanical transmission is used, mechanical wear or the like occurs in the transmission, so that regular maintenance is required. On the other hand, a rotary electric machine that can change the rotation speed of a rotor in a non-contact manner is disclosed as a magnetic wave gear device or a magnetic geared generator (see, for example, Patent Document 1).

The magnetic wave gear device disclosed in Patent Document 1 includes a stator, a first rotor which rotates at a low speed, and a second rotor which rotates at a high speed in accordance with a gear ratio, in order from the outer circumferential side with a rotary shaft as a center. The stator has a stator coil which can output generated power or allows generated torque to be controlled. When the rotary electric machine is used, the rotation speed of the rotor can be changed in a non-contact manner, so that maintenance due to mechanical wear or the like is unnecessary, and the burden of maintenance can be reduced. In addition, when the rotary electric machine is used as a generator, speed change and power generation are possible with one rotary electric machine without a mechanical transmission, the size of a power generation system is reduced, and space saving can be achieved.

CITATION LIST

Patent Document

Patent Document 1: Japanese Laid-Open Patent Publication No. 2016-135014

SUMMARY OF THE INVENTION

Problems to be Solved by the Invention

In the structure of the rotary electric machine in Patent Document 1, the stator has a stator core having a plurality of stator slots, and both a stator coil and a stator magnet are stored in each stator slot, so that both speed change and power generation can be performed with one rotary electric machine. In addition, a chip portion which is a magnetic body is provided as a back yoke at a part on the stator coil side of the stator magnet so as to project from a wall surface of the stator slot, so that output increase is achieved.

However, in the case where the chip portion is provided between the stator coil and the stator magnet, it is difficult to insert the stator coil into a bottom portion of the stator slot in a manufacturing process for the stator, thus causing a problem that the workability deteriorates.

In the case where, in order to easily insert the stator coil into the bottom portion of the stator slot, a chip portion is not provided, the stator coil is not stably fixed at the bottom portion of the stator slot, thus causing a problem that due to friction generated when the stator coil moves inside the stator slot toward the stator magnet side, or the like, the insulation of the stator coil deteriorates and the reliability is impaired.

The present disclosure has been made to solve the above problems, and an object of the present disclosure is to obtain a high-output stator through a simple manufacturing process.

Solution to the Problems

A stator according to the present disclosure is a stator including: a stator core including a plurality of stator teeth in a circumferential direction with respect to a center of rotation of a rotary electric machine; a stator coil disposed on a bottom portion side of each of a plurality of stator slots formed between the stator teeth; and a stator magnet disposed on an opening side of each of the plurality of stator slots and having the same polarity in a radial direction, wherein, in each of the stator slots, a plate-shaped fixing member is provided between the stator coil and the stator magnet so as to be fitted to opposed two wall surfaces of the stator slot, and a magnetic body is provided between the stator coil and the stator magnet.

Effect of the Invention

In the stator according to the present disclosure, it is possible to obtain a high output with a simple manufacturing process.

DESCRIPTION OF EMBODIMENTS

Figure 1:
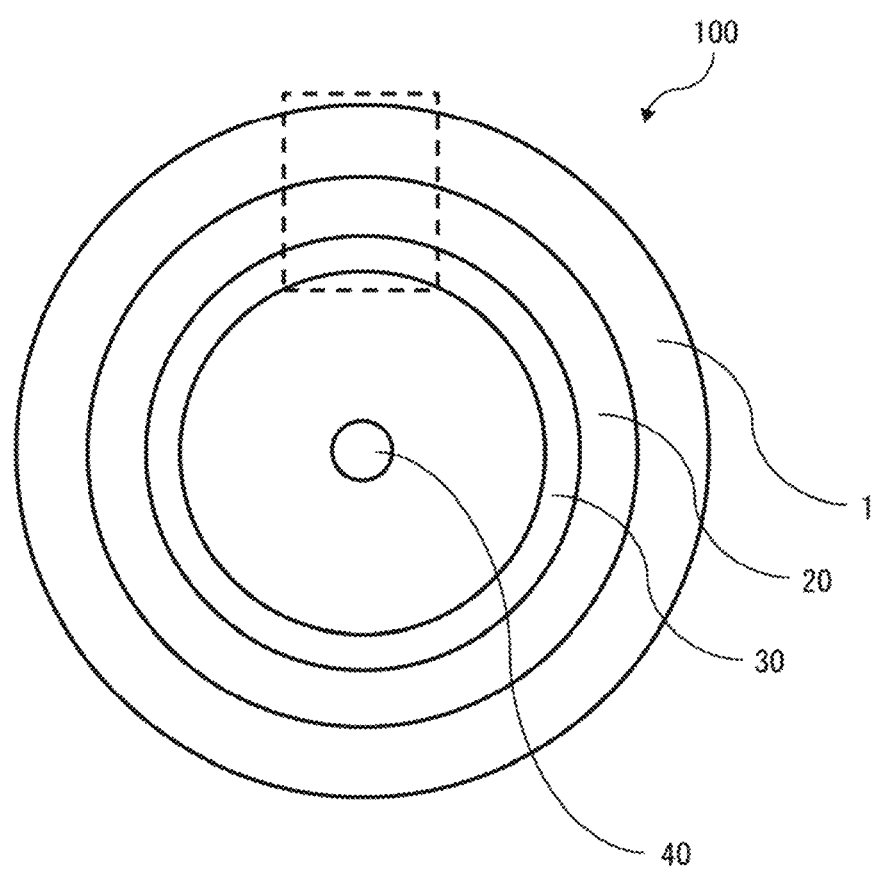
FIG. 1 is a schematic diagram showing a cross-section of a rotary electric machine according to Embodiment 1.

Hereinafter, stators according to embodiments of the present disclosure and rotary electric machines using the same will be described with reference to the drawings. In the drawings, the same or corresponding members and parts are denoted by the same reference characters to give description.

Embodiment 1

Figure 2:
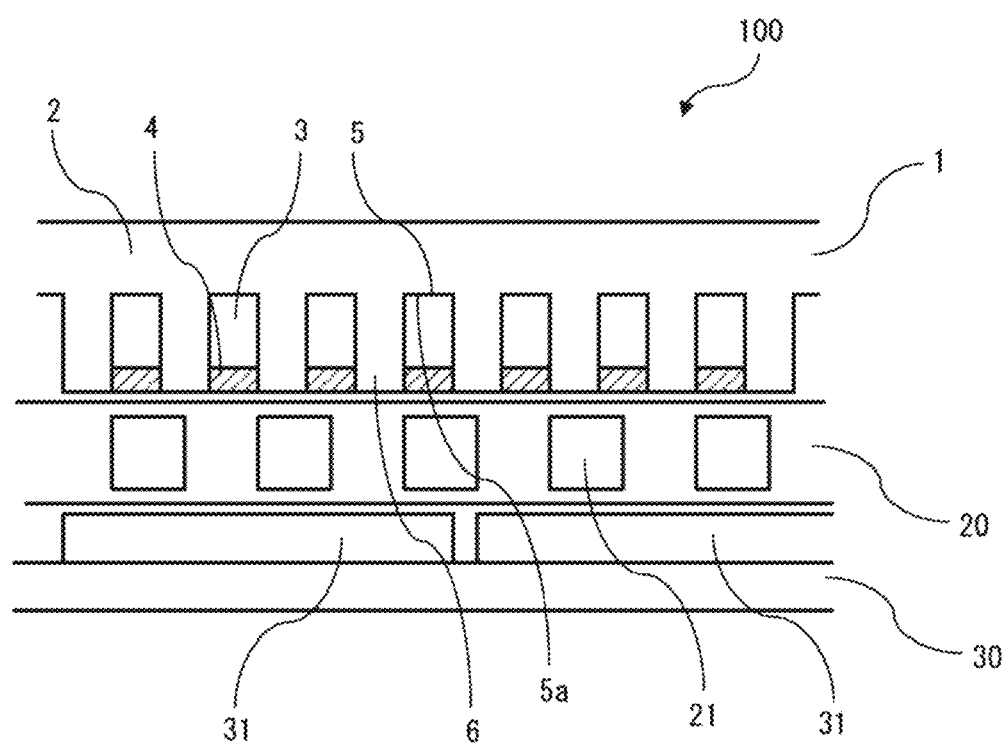
FIG. 2 is a schematic diagram showing a major part of the rotary electric machine according to Embodiment 1.

FIG. 1 is a schematic diagram showing a cross-section of a rotary electric machine 100, and FIG. 2 is a schematic diagram showing a major part of the rotary electric machine 100. FIG. 2 is an enlarged view of a portion surrounded by a broken line in FIG. 1. As shown in FIG. 1, the rotary electric machine 100 includes: an annular stator 1 which surrounds a rotary shaft 40 which is at the center of rotation of the rotary electric machine 100; a low-speed rotor 20 which is a first rotor provided coaxially with the stator 1; and a high-speed rotor 30 which is a second rotor provided coaxially with the low-speed rotor 20 so as to be opposed to the low-speed rotor 20. First, a general structure and operation of a magnetic geared generator as the rotary electric machine 100 will be described.

As shown in FIG. 2, the stator 1 includes a stator core 2, a stator coil 3, and stator magnets 4. The annular stator core 2 includes a plurality of stator teeth 6 provided at equal intervals in the circumferential direction with respect to the center of rotation of the rotary electric machine 100. A plurality of stator slots 5 formed between the stator teeth 6 each include the stator coil 3 and the stator magnet 4. The stator coil 3 is disposed on a bottom portion 5a side of the stator slot 5. The stator magnet 4 is disposed on the opening side of the stator slot 5. The stator magnets 4 are all magnetized in the same direction in the radial direction. Each stator magnet 4 is, for example, a neodymium sintered magnet, but is not limited thereto. When the radially inner side of the stator magnet 4 is an N pole, the radially inner side of each stator tooth 6 adjacent thereto is an S pole, and pole pairs, the number Ns of which is equal to the number of stator slots 5, are formed.

The low-speed rotor 20 is provided on the inner circumferential side of the stator 1 so as to be opposed to the stator magnets 4 across a minute gap. The low-speed rotor 20 has a plurality of magnetic pole pieces 21 arranged at equal intervals in the circumferential direction, and rotates at a low speed by external power. The number of magnetic pole pieces 21 is denoted by NL. The high-speed rotor 30 is provided on the inner circumferential side of the low-speed rotor 20. The high-speed rotor 30 has high-speed rotor magnets 31 which are a plurality of permanent magnets and provided on an outer circumferential portion thereof at equal intervals, and pole pairs, the number of which is Nh, are formed.

If the relationship between Ns, NL, and Nh satisfies NL=Ns±Nh, a negative torque is generated in the low-speed rotor 20 due to the interaction between the magnetic forces of the stator magnets 4 and the high-speed rotor magnets 31. On the other hand, by rotating the low-speed rotor 20 by external power, an input can be obtained at the low-speed rotor 20. If a stator current is applied to the stator coil 3 such that the high-speed rotor 30 freely runs with respect to the input of the low-speed rotor 20, the high-speed rotor 30 rotates at a rotation speed that is NL/Nh times that of the low-speed rotor 20. When the high-speed rotor 30 rotates at a speed that is NL/Nh times that of the low-speed rotor 20, an induced electromotive force is generated in the stator coil 3. Due to the generation of the induced electromotive force, generated power is outputted from the stator coil 3.

Figure 3:
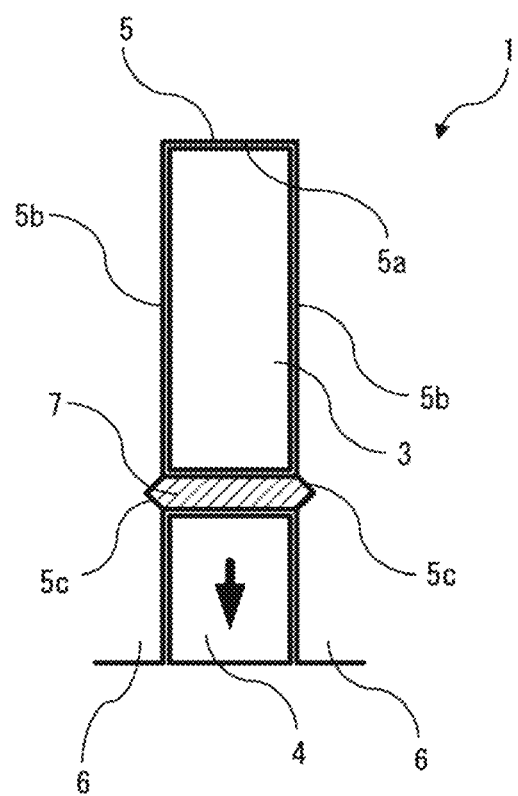
FIG. 3 is a schematic diagram showing a cross-section of a stator slot of the rotary electric machine according to Embodiment 1.

The internal configuration of the stator slot 5 which is a major part of the present disclosure will be described. FIG. 3 is a schematic diagram showing a cross-section of the stator slot 5 of the rotary electric machine 100 according to Embodiment 1. Each stator slot 5 includes the stator coil 3, the stator magnet 4, and a magnetic body between the stator coil 3 and the stator magnet 4. Here, the magnetic body is a magnetic wedge 7 which is a plate-shaped fixing member made from a ferromagnetic material or a plate-shaped fixing member containing a ferromagnetic material. The magnetic wedge 7 is provided between the stator coil 3 and the stator magnet 4 so as to be fitted to cutouts 5c of opposed two wall surfaces 5b of the stator slot 5. The stator coil 3 and the stator magnet 4 are opposed to each other across the magnetic wedge 7. The magnetic wedge 7 is produced, for example, by mixing magnetic powder with a resin material, but is not limited thereto, and may be a magnetic wedge 7 made from a ferromagnetic material such as an electromagnetic steel sheet. Each stator magnet 4 is magnetized so as to have the same polarity in the radial direction. For example, the direction of an arrow shown in FIG. 3 is the magnetization direction.

The stator coil 3 is stably fixed at the bottom portion 5a of the stator slot 5 by fixing the magnetic wedge 7 so as to be fitted to the cutouts 5c. The stator magnet 4 is fixed, for example, so as to be adhered to the wall surfaces 5b. In a manufacturing process for the stator 1, the magnetic wedge 7 is provided by inserting the magnetic wedge 7 into the cutouts 5c in an axial direction perpendicular to the drawing sheet after the stator coil 3 is inserted into the stator slot 5. Therefore, the magnetic wedge 7 does not hamper the insertion of the stator coil 3 into the stator slot 5, and it is easy to insert the stator coil 3 into the stator slot 5. In addition, since the magnetic wedge 7 is provided through fitting, it is easy to install the magnetic wedge 7 into the stator slot 5, and the stator coil 3 is easily fixed in the stator slot 5.

Figure 4:
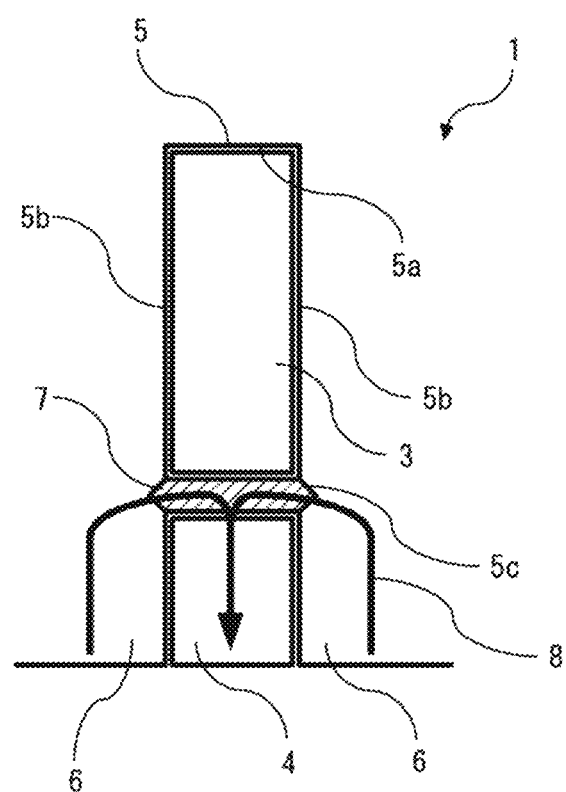
FIG. 4 is a schematic diagram illustrating a magnetic flux around a stator magnet of the rotary electric machine according to Embodiment 1.

FIG. 4 is a schematic diagram illustrating a magnetic flux 8 around the stator magnet 4 of the rotary electric machine 100 according to Embodiment 1. FIG. 4 is a diagram in which the magnetic flux 8 caused by the stator magnet 4 is added to FIG. 3. In the case where the magnetic wedge 7 is not provided, the magnetic flux 8 extends from the stator teeth 6 through the stator coil 3 side toward the stator magnet 4. In the case where the magnetic wedge 7 is provided, as shown in FIG. 4, the magnetic flux 8 extends from the stator teeth 6 through the magnetic wedge 7 toward the stator magnet 4. The magnetic flux 8 is concentrated on the magnetic wedge 7 and passes near the stator magnet 4, so that the magnetic force of the stator magnet 4 is improved. Since the magnetic force of the stator magnet 4 is improved, a high-output stator 1 is obtained. In addition, due to the configuration improving the magnetic force of the stator magnet 4, it is also possible to obtain a predetermined torque from the rotary electric machine 100 by using stator magnets 4 having a reduced size.

As described above, in the stator 1 according to Embodiment 1, since the plate-shaped magnetic wedge 7 is provided between the stator coil 3 and each stator magnet 4 so as to be fitted to the cutouts 5c of the opposed two wall surfaces 5b of the stator slot 5, the magnetic flux 8 passes near the stator magnet 4, and the magnetic force of the stator magnet 4 is improved, so that a high-output stator 1 can be obtained. In addition, it is easy to insert the stator coil 3 into the stator slot 5, so that the stator 1 can be produced through a simple manufacturing process. Moreover, since the magnetic wedge 7 is provided through fitting, the stator 1 can be produced through a simple manufacturing process. Furthermore, the stator coil 3 can be fixed to the stator slot 5 through a simple manufacturing process.

Embodiment 2

Figure 5:
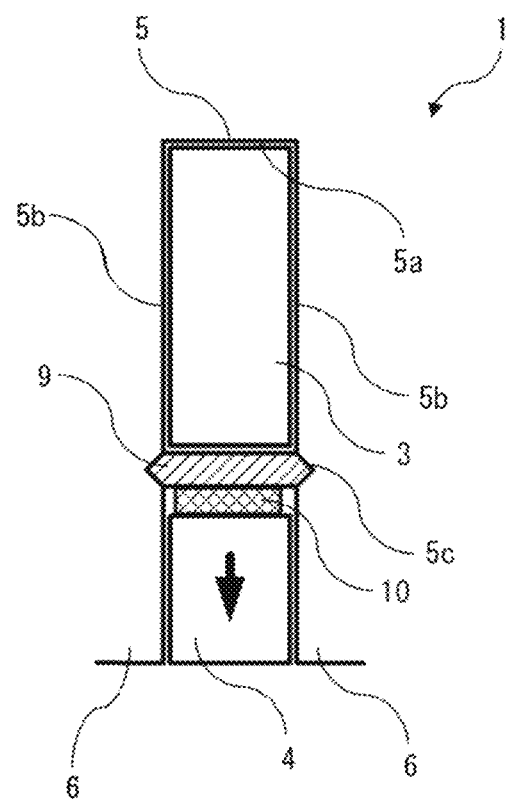
FIG. 5 is a schematic diagram showing a cross-section of a stator slot of a rotary electric machine according to Embodiment 2.

A stator 1 according to Embodiment 2 will be described. FIG. 5 is a schematic diagram showing a cross-section of a stator slot 5 of a rotary electric machine 100. The stator 1 according to Embodiment 2 has a configuration in which a ferromagnetic material 10 is provided between a wedge 9 and a stator magnet 4.

The stator slot 5 includes a stator coil 3, the stator magnet 4, and the wedge 9 which is a plate-shaped fixing member between the stator coil 3 and the stator magnet 4, and further includes the ferromagnetic material 10 which is a magnetic body between the wedge 9 and the stator magnet 4. The wedge 9 is provided between the stator coil 3 and the stator magnet 4 so as to be fitted to cutouts 5c of opposed two wall surfaces 5b of the stator slot 5. The stator coil 3 and the stator magnet 4 are opposed to each other across the wedge 9. The wedge 9 is produced from, for example, a non-magnetic resin material, but is not limited thereto, and may be a magnetic wedge 7. The ferromagnetic material 10 is produced from, for example, iron or an electromagnetic steel sheet, but is not limited thereto.

The stator coil 3 is stably fixed at a bottom portion 5a of the stator slot 5 by fixing the wedge 9 so as to be fitted to the cutouts 5c. In a manufacturing process for the stator 1, the wedge 9 is provided by inserting the wedge 9 into the cutouts 5c in an axial direction perpendicular to the drawing sheet after the stator coil 3 is inserted into the stator slot 5. Therefore, the wedge 9 does not hamper the insertion of the stator coil 3 into the stator slot 5, and it is easy to insert the stator coil 3 into the stator slot 5. In addition, since the wedge 9 is provided through fitting, it is easy to install the wedge 9 into the stator slot 5, and the stator coil 3 is easily fixed in the stator slot 5. The stator magnet 4 is fixed, for example, so as to be adhered to the wall surfaces 5b. The ferromagnetic material 10 is fixed so as to be inserted between the stator magnet 4 and the wedge 9. The ferromagnetic material 10 may be fixed so as to be adhered to either one of or both the stator magnet 4 and the wedge 9.

Since the ferromagnetic material 10 is provided, even if the wedge 9 is non-magnetic, a magnetic flux 8 extends from stator teeth 6 through the ferromagnetic material 10 toward the stator magnet 4. The magnetic flux 8 is concentrated on the ferromagnetic material 10 and passes near the stator magnet 4, so that the magnetic force of the stator magnet 4 is improved. Since the magnetic force of the stator magnet 4 is improved, a high-output stator 1 is obtained. In addition, due to the configuration improving the magnetic force of the stator magnet 4, it is also possible to obtain a predetermined torque from the rotary electric machine 100 by using stator magnets 4 having a reduced size.

As described above, in the stator 1 according to Embodiment 2, since the ferromagnetic material 10 is added between the wedge 9 and the stator magnet 4, even in the configuration using the existing non-magnetic wedge 9, the magnetic flux 8 passes near the stator magnet 4 without significantly changing the configuration, and the magnetic force of the stator magnet 4 is improved, so that a high-output stator 1 can be obtained.

Embodiment 3

Figure 6:
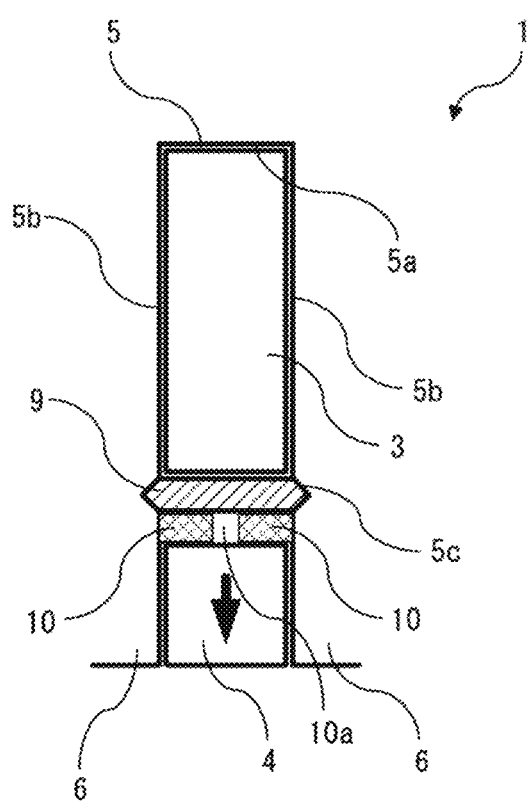
FIG. 6 is a schematic diagram showing a cross-section of a stator slot of a rotary electric machine according to Embodiment 3.

A stator 1 according to Embodiment 3 will be described. FIG. 6 is a schematic diagram showing a cross-section of a stator slot 5 of a rotary electric machine 100. The stator 1 according to Embodiment 3 has a configuration in which a ferromagnetic material 10 is divided in the circumferential direction.

Figure 7:
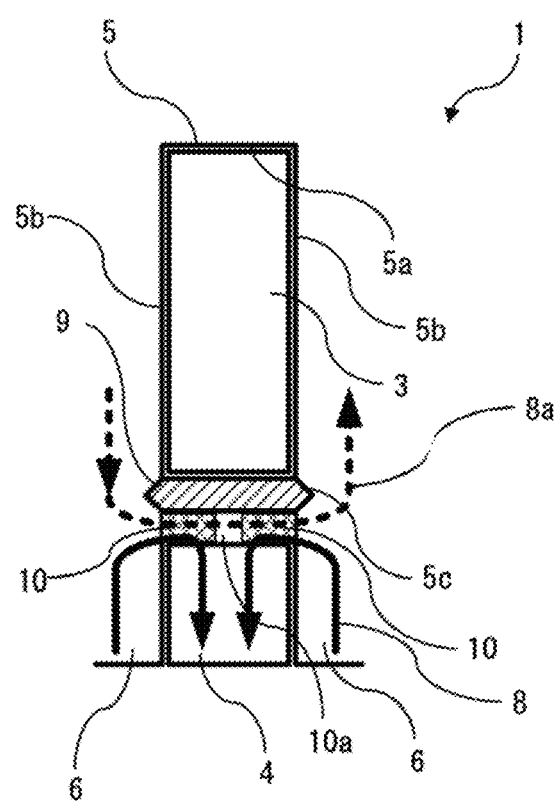
FIG. 7 is a schematic diagram illustrating a magnetic flux around a stator magnet of the rotary electric machine according to Embodiment 3.

The stator slot 5 includes a stator coil 3, a stator magnet 4, and a wedge 9 which is a plate-shaped fixing member between the stator coil 3 and the stator magnet 4, and further includes the ferromagnetic material 10 which is a magnetic body divided in the circumferential direction, between the wedge 9 and the stator magnet 4. The location (division portion 10a) where the ferromagnetic material 10 is divided is the center in the circumferential direction of the stator slot 5. Since the ferromagnetic material 10 is provided, even if the wedge 9 is non-magnetic, a magnetic flux 8 is concentrated on the ferromagnetic material 10, and the magnetic force of the stator magnet 4 is improved. However, as shown in FIG. 7, not only the magnetic flux 8 caused by the stator magnet 4 but also a magnetic flux 8a caused by the stator coil 3 passes through the ferromagnetic material 10. The magnetic flux 8a is a leakage magnetic flux. As the leakage magnetic flux drawn into the ferromagnetic material 10 increases, the generated power from the stator coil 3 decreases. In order to reduce the leakage magnetic flux drawn into the ferromagnetic material 10, the division portion 10a is provided. The division portion 10a is an air layer, and the leakage magnetic flux drawn into the ferromagnetic material 10 is reduced.

The reason why the division portion 10a is provided at the center in the circumferential direction of the stator slot 5 will be described. Since the stator magnet 4 is magnetized so as to have the same polarity in the radial direction, the magnetic flux 8 extends from stator teeth 6 through the ferromagnetic material 10 toward the stator magnet 4 as shown in FIG. 7. At the stator magnet 4, the magnetic flux 8 generated from the center in the circumferential direction of the stator slot 5 toward the stator teeth 6 has a long distance from the center to each stator tooth 6, so that it is most difficult to obtain a magnetic force therefrom. That is, if the division portion 10a of the ferromagnetic material 10 is provided at the center portion of the stator slot 5, the division portion 10a is effectively provided, and the leakage magnetic flux drawn from the stator coil 3 into the ferromagnetic material 10 can be reduced without impairing the magnetic flux 8, which passes near the stator magnet 4, as much as possible.

Figure 8:
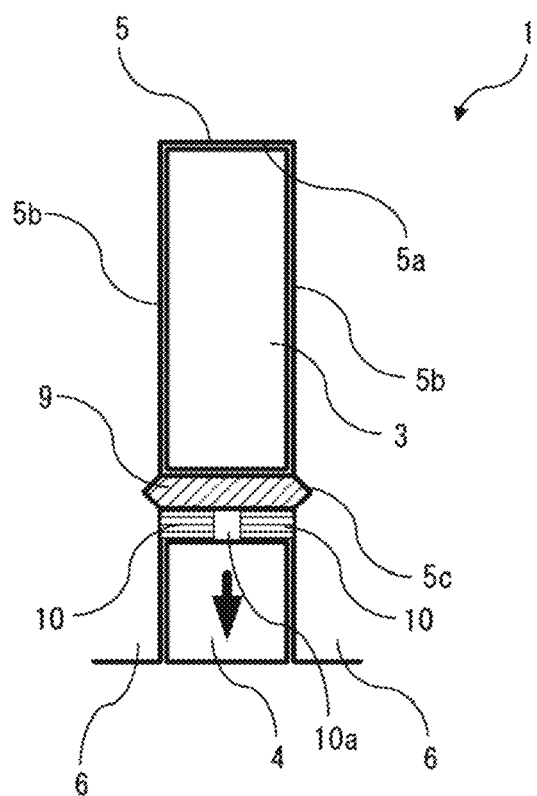
FIG. 8 is a schematic diagram showing a cross-section of another stator slot of the rotary electric machine according to Embodiment 3.

FIG. 8 is a schematic diagram showing a cross-section of another stator slot 5 of the rotary electric machine 100 according to Embodiment 3. In the case where the ferromagnetic material 10 is produced from electromagnetic steel sheets, the direction in which the electromagnetic steel sheets are stacked may be the radial direction as shown in FIG. 8, but is not limited thereto, and the direction in which the electromagnetic steel sheets are stacked may be the circumferential direction.

As described above, in the stator 1 according to Embodiment 3, since the ferromagnetic material 10 divided in the circumferential direction is provided between the wedge 9 and the stator magnet 4, the leakage magnetic flux caused by the stator coil 3 and drawn into the ferromagnetic material 10 can be reduced. In addition, in the case where the division portion 10*a* of the ferromagnetic material 10 is provided at the center in the circumferential direction of the stator slot 5, the leakage magnetic flux drawn from the stator coil 3 into the ferromagnetic material 10 can be reduced without impairing the magnetic flux 8, which passes near the stator magnet 4, as much as possible.

Embodiment 4

Figure 9:
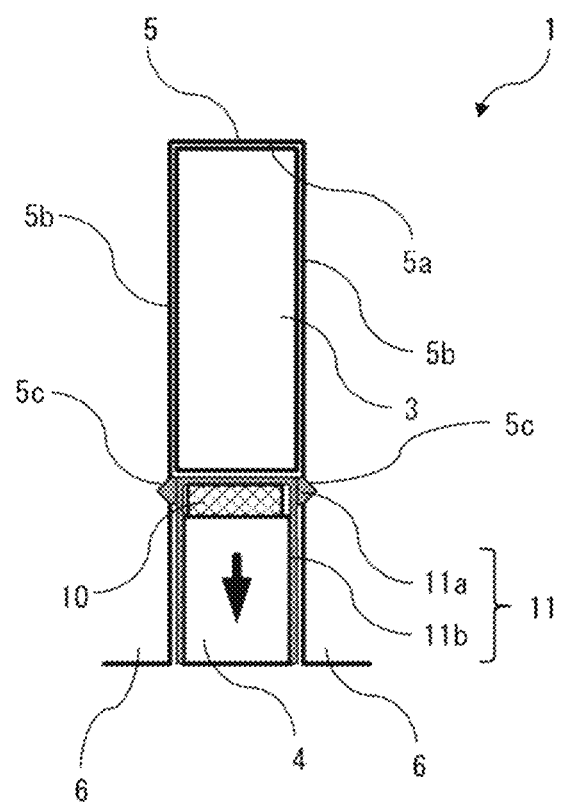
FIG. 9 is a schematic diagram showing a cross-section of a stator slot of a rotary electric machine according to Embodiment 4.

A stator 1 according to Embodiment 4 will be described. FIG. 9 is a schematic diagram showing a cross-section of a stator slot 5 of a rotary electric machine 100. The stator 1 according to Embodiment 4 has a configuration in which a cover 11 is provided inside the stator slot 5.

The stator slot 5 includes a stator coil 3, a stator magnet 4, a ferromagnetic material 10, and the cover 11. The cover 11 is formed by a fixing member 11*a* which is provided between the stator coil 3 and the stator magnet 4 so as to be fitted to cutouts 5*c* of opposed two wall surfaces 5*b* of the stator slot 5, and two side wall portions 11*b* which extend from the fixing member 11*a* along the wall surfaces 5*b* so as to be parallel to the direction toward the opening. The cover 11 may be a non-magnetic member or may be a magnetic member, and if the cover 11 is a non-magnetic member, the cover 11 is produced from, for example, a resin. The stator magnet 4 is disposed on the opening side of the stator slot 5 so as to be interposed between the two side wall portions 11*b*. The ferromagnetic material 10 which is a magnetic body is provided between the fixing member 11*a* and the stator magnet 4. The stator coil 3 and the stator magnet 4 are opposed to each other across the ferromagnetic material 10 and the fixing member 11*a*.

The stator coil 3 is stably fixed at a bottom portion 5*a* of the stator slot 5 by fixing the cover 11 so as to be fitted to the cutouts 5*c*. In a manufacturing process for the stator 1, the cover 11 is provided by inserting the cover 11 into the cutouts 5*c* in an axial direction perpendicular to the drawing sheet after the stator coil 3 is inserted into the stator slot 5. Therefore, the cover 11 does not hamper the insertion of the stator coil 3 into the stator slot 5, and it is easy to insert the stator coil 3 into the stator slot 5. In addition, since the cover 11 is provided through fitting, it is easy to install the cover 11 into the stator slot 5, and the stator coil 3 is easily fixed in the stator slot 5.

The stator magnet 4 is fixed, for example, so as to be adhered to the side wall portions 11*b*. The ferromagnetic material 10 is fixed so as to be inserted between the stator magnet 4 and the cover 11. The ferromagnetic material 10 may be fixed so as to be adhered to either one of or both the stator magnet 4 and the cover 11. The stator magnet 4 and the ferromagnetic material 10 may be provided inside the cover 11 after the cover 11 is provided in the stator slot 5, but the cover 11 may be provided in the stator slot 5 after the stator magnet 4 and the ferromagnetic material 10 are provided inside the cover 11. By providing the stator magnet 4 and the ferromagnetic material 10 in the cover 11 before the cover 11 is installed in the stator slot 5, the manufacturing process is simplified.

Since the ferromagnetic material 10 is provided, even if the cover 11 is non-magnetic, a magnetic flux 8 extends from stator teeth 6 through the ferromagnetic material 10 toward the stator magnet 4. The magnetic flux 8 is concentrated on the ferromagnetic material 10 and passes near the stator magnet 4, so that the magnetic force of the stator magnet 4 is improved. Since the magnetic force of the stator magnet 4 is improved, a high-output stator 1 is obtained. In addition, due to the configuration improving the magnetic force of the stator magnet 4, it is also possible to obtain a predetermined torque from the rotary electric machine 100 by using stator magnets 4 having a reduced size.

Figure 10:
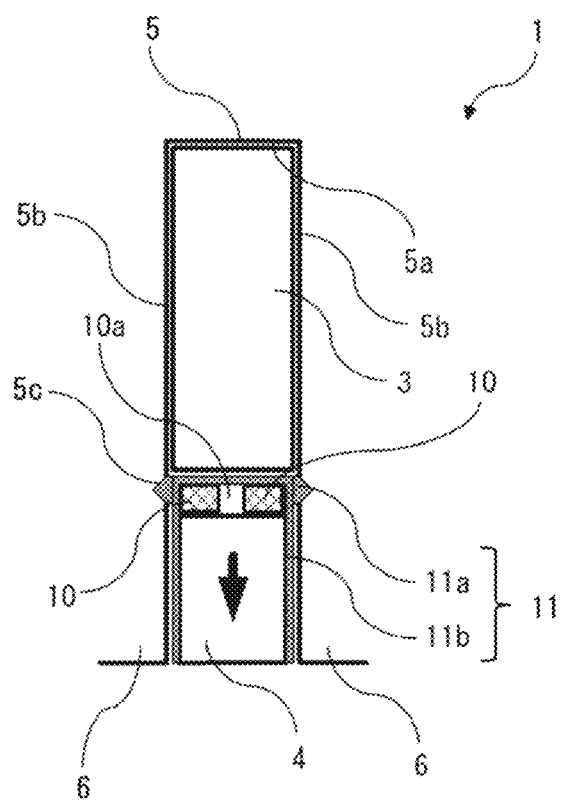
FIG. 10 is a schematic diagram showing a cross-section of another stator slot of the rotary electric machine according to Embodiment 4.

The ferromagnetic material 10 may be configured to be divided in the circumferential direction as shown in FIG. 10. By providing a division portion 10*a* in the ferromagnetic material 10, the leakage magnetic flux caused by the stator coil 3 and drawn into the ferromagnetic material 10 can be reduced.

As described above, in the stator 1 according to Embodiment 4, since the cover 11 is provided inside the stator slot 5, and the stator magnet 4 and the ferromagnetic material 10 are provided inside the cover 11, the magnetic flux 8 passes near the stator magnet 4, and the magnetic force of the stator magnet 4 is improved, so that a high-output stator 1 can be obtained. In the case where the stator magnet 4 and the ferromagnetic material 10 are provided in the cover 11 before the cover 11 is installed in the stator slot 5, the stator 1 can be produced through a simple manufacturing process.

Embodiment 5

Figure 11:
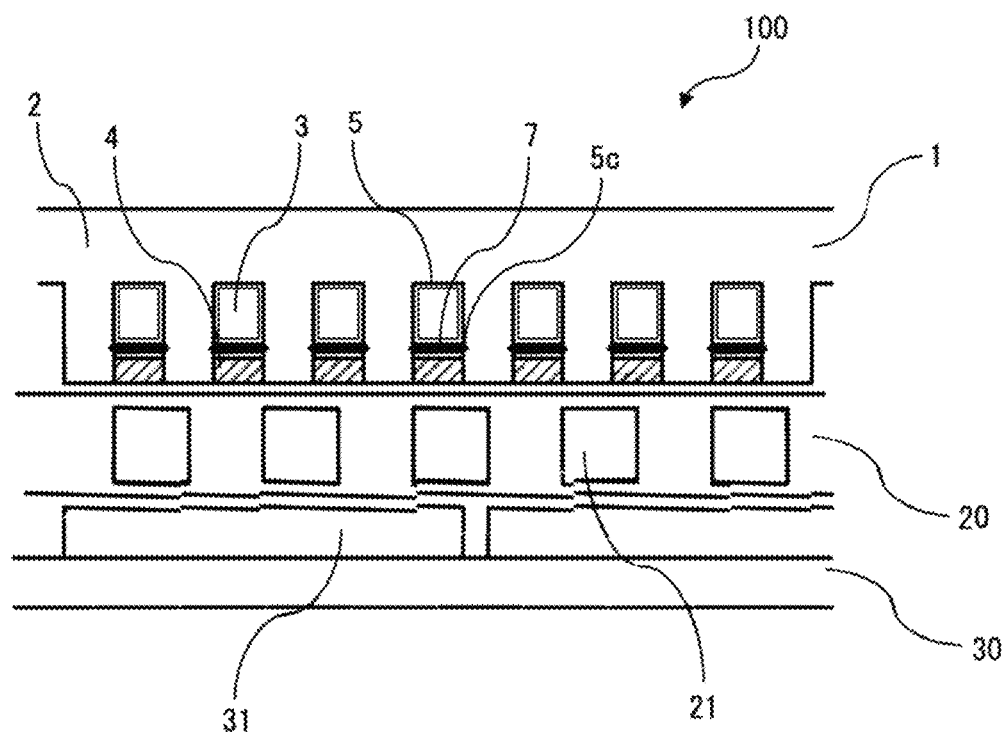
FIG. 11 is a schematic diagram showing a major part of a rotary electric machine according to Embodiment 5.

In Embodiment 5, a rotary electric machine 100 in which the stator 1 described in Embodiment 1 is used will be described. FIG. 11 is a schematic diagram showing a major part of the rotary electric machine 100. The rotary electric machine 100 according to Embodiment 5 has a configuration in which a plate-shaped magnetic wedge 7 is provided between a stator coil 3 and a stator magnet 4 in each stator slot 5.

As shown in FIG. 11, the rotary electric machine 100 includes: an annular stator 1 which surrounds a rotary shaft (not shown) which is at the center of rotation of the rotary electric machine 100; a low-speed rotor 20 which is a first rotor having a plurality of magnetic pole pieces 21 and provided coaxially with the stator 1 so as to be opposed to the stator magnets 4; and a high-speed rotor 30 which is a second rotor having high-speed rotor magnets 31, which are a plurality of permanent magnets, and provided coaxially with the low-speed rotor 20 so as to be opposed to the low-speed rotor 20. The stator 1 includes a stator core 2, the stator coil 3, the stator magnets 4, and the magnetic wedges 7. The annular stator core 2 includes a plurality of stator teeth 6 provided at equal intervals in the circumferential direction with respect to the center of rotation of the rotary electric machine 100. Each stator slot 5 is formed between the stator teeth 6. Each magnetic wedge 7 is provided between the stator coil 3 and the stator magnet 4 so as to be fitted to cutouts 5*c* of opposed two wall surfaces 5*b* of the stator slot 5. In a manufacturing process for the stator 1, the magnetic wedge 7 is provided by inserting the magnetic wedge 7 into the cutouts 5*c* in an axial direction perpendicular to the drawing sheet after the stator coil 3 is inserted into the stator slot 5.

As described above, in the rotary electric machine 100 according to Embodiment 5, since the magnetic wedge 7 is provided, the magnetic flux passes near the stator magnet 4, and the magnetic force of the stator magnet 4 is improved, so that a high-output stator 1 can be obtained, and the output of the rotary electric machine 100 is increased. In addition, since it is easy to insert the stator coil 3 into the stator slot 5, the rotary electric machine 100 can be produced through a simple manufacturing process, and the stator coil 3 can be fixed to the stator slot 5 through a simple manufacturing process.

Although the rotary electric machine 100 in which the stator 1 described in Embodiment 1 is used has been described above, also in each of rotary electric machines 100 in which the stators 1 described in Embodiment 2 to Embodiment 4 are used, the output of the rotary electric machine 100 is increased, and the rotary electric machine 100 can be produced through a simple manufacturing process. In addition, the same effects are achieved in a generator or a motor including a stator 1 having the same configuration as in the present disclosure. Moreover, although the rotary electric machines 100 in each of which the stator 1 is located at the outermost circumference have been described above, the placement of the stator 1 is not limited to the outermost circumference, and an outer rotor type rotary electric machine in which the stator 1 is located at the innermost circumference may be adopted. In the case where the stator 1 is provided at the innermost circumference, the stator core includes a plurality of stator slots which are arranged in the circumferential direction and are open toward the outer circumferential side of the rotary electric machine.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 stator
2 stator core
3 stator coil
4 stator magnet
5 stator slot
5a bottom portion
5b wall surface
5c cutout
6 stator teeth
7 magnetic wedge
8 magnetic flux
9 wedge
10 ferromagnetic material
10a division portion
11 cover
11a fixing member
11b side wall portion
20 low-speed rotor
21 magnetic pole piece
30 high-speed rotor
31 high-speed rotor magnet
40 rotary shaft
100 rotary electric machine

The invention claimed is:

1. A stator comprising:
a stator core including a plurality of stator teeth in a circumferential direction with respect to a center of rotation;
a stator coil disposed on a bottom portion side of each of a plurality of stator slots formed between the stator teeth; and
a stator magnet disposed on an opening side of each of the plurality of stator slots and having the same polarity in a radial direction, wherein
in each of the stator slots, a plate-shaped fixing member is provided between the stator coil and the stator magnet so as to be fitted to opposed two wall surfaces of the stator slot,
a magnetic body is provided between the stator coil and the stator magnet,
two side wall portions extend from the fixing member along the wall surfaces, and
the stator magnet is interposed between the two side wall portions.

2. The stator according to claim 1, wherein the magnetic body is the fixing member made from a ferromagnetic material or the fixing member containing a ferromagnetic material.

3. A rotary electric machine comprising:
the stator according to claim 2;
a first rotor having a plurality of magnetic pole pieces and provided coaxially with the stator so as to be opposed to the stator magnets; and
a second rotor having a plurality of permanent magnets and provided coaxially with the first rotor so as to be opposed to the first rotor,
wherein the center of rotation is a center of rotation of the rotary electric machine.

4. A rotary electric machine comprising:
the stator according to claim 1;
a first rotor having a plurality of magnetic pole pieces and provided coaxially with the stator so as to be opposed to the stator magnets; and
a second rotor having a plurality of permanent magnets and provided coaxially with the first rotor so as to be opposed to the first rotor,
wherein the center of rotation is a center of rotation of the rotary electric machine.

5. The rotary machine according to claim 4, wherein ends of the two side wall portions oppose the first rotor.

6. The stator according to claim 1, wherein the two side wall portions extend as far as the stator teeth.

7. A rotary electric machine comprising:
the stator according to claim 6;
a first rotor having a plurality of magnetic pole pieces and provided coaxially with the stator so as to be opposed to the stator magnets, and
a second rotor having a plurality of permanent magnets and provided coaxially with the first rotor so as to be opposed to the first rotor,
wherein the center of rotation is a center of rotation of the rotary electric machine.

8. The stator according to claim 1, wherein the magnetic body is a ferromagnetic material provided between the fixing member and the stator magnet.

9. A rotary electric machine comprising:
the stator according to claim 8;
a first rotor having a plurality of magnetic pole pieces and provided coaxially with the stator so as to be opposed to the stator magnets; and a second rotor having a plurality of permanent magnets and provided coaxially with the first rotor so as to be opposed to the first rotor,
wherein the center of rotation is a center of rotation of the rotary electric machine.

10. The stator according to claim 8, wherein the magnetic body is divided in the circumferential direction.

11. A rotary electric machine comprising:
the stator according to claim 10;
a first rotor having a plurality of magnetic pole pieces and provided coaxially with the stator so as to be opposed to the stator magnets, and
a second rotor having a plurality of permanent magnets and provided coaxially with the first rotor so as to be opposed to the first rotor,
wherein the center of rotation is a center of rotation of the rotary electric machine.

12. The stator according to claim 10, wherein the magnetic body is divided in the circumferential direction by air.

13. A rotary electric machine comprising:
the stator according to claim 12;
a first rotor having a plurality of magnetic pole pieces and provided coaxially with the stator so as to be opposed to the stator magnets; and
a second rotor having a plurality of permanent magnets and provided coaxially with the first rotor so as to be opposed to the first rotor,
wherein the center of rotation is a center of rotation of the rotary electric machine.

14. The stator according to claim 1, wherein
the two side wall portions extend from the fixing member along the wall surfaces so as to be parallel to a direction toward the opening side,
the fixing member and the two side wall portions form a cover, and
the magnetic body is a ferromagnetic material provided between the fixing member and the stator magnet.

15. A rotary electric machine comprising:
the stator according to claim 14;
a first rotor having a plurality of magnetic pole pieces and provided coaxially with the stator so as to be opposed to the stator magnets; and
a second rotor having a plurality of permanent magnets and provided coaxially with the first rotor so as to be opposed to the first rotor,
wherein the center of rotation is a center of rotation of the rotary electric machine.

16. The stator according to claim 14, wherein the magnetic body is divided in the circumferential direction.

17. A rotary electric machine comprising:
the stator according to claim 16;
a first rotor having a plurality of magnetic pole pieces and provided coaxially with the stator so as to be opposed to the stator magnets; and
a second rotor having a plurality of permanent magnets and provided coaxially with the first rotor so as to be opposed to the first rotor,
wherein the center of rotation is a center of rotation of the rotary electric machine.

18. The stator according to claim 16, wherein the magnetic body is divided in the circumferential direction by air.

19. A rotary electric machine comprising:
the stator according to claim 18;
a first rotor having a plurality of magnetic pole pieces and provided coaxially with the stator so as to be opposed to the stator magnets; and
a second rotor having a plurality of permanent magnets and provided coaxially with the first rotor so as to be opposed to the first rotor,
wherein the center of rotation is a center of rotation of the rotary electric machine.

* * * * *